US012811336B2

(12) United States Patent
Masada et al.

(10) Patent No.: US 12,811,336 B2
(45) Date of Patent: Nov. 24, 2026

(54) WATERPROOF CONNECTOR TO BE FITTED TO A MATING CONNECTOR IN A FITTING DIRECTION

(71) Applicant: J.S.T. MFG. CO., LTD., Tokyo (JP)

(72) Inventors: Shinya Masada, Yokohama (JP); Saki Katsumoto, Yokohama (JP); Chika Kadono, Osaka (JP)

(73) Assignee: J.S.T. MFG. CO., LTD., Tokyo (JP)

( * ) Notice: Subject to any disclaimer, the term of this patent is extended or adjusted under 35 U.S.C. 154(b) by 341 days.

(21) Appl. No.: 18/626,885

(22) Filed: Apr. 4, 2024

(65) Prior Publication Data

US 2024/0356272 A1 Oct. 24, 2024

(30) Foreign Application Priority Data

Apr. 20, 2023 (JP) ................................ 2023-069397

(51) Int. Cl.
*H01R 13/52* (2006.01)
*H01R 13/508* (2006.01)

(52) U.S. Cl.
CPC ....... *H01R 13/5219* (2013.01); *H01R 13/508* (2013.01); *H01R 13/5213* (2013.01)

(58) Field of Classification Search
CPC .............. H01R 13/5219; H01R 13/508; H01R 13/5213; H01R 13/4361; H01R 13/5205; H01R 13/506; H01R 13/52; H01R 13/502; H01R 13/521; H01R 13/5208; H01R 13/422; H01R 13/641; H01R 13/642; H01R 13/7032
See application file for complete search history.

(56) References Cited

U.S. PATENT DOCUMENTS 11,677,177 B2 * 6/2023 Aoshima ............ H01R 13/5205 439/587
12,347,959 B2 * 7/2025 Nakai .................. H01R 13/422

FOREIGN PATENT DOCUMENTS

JP 2001110504 A * 4/2001 ........... H01R 13/521
JP 2020-024822 A 2/2020

* cited by examiner

*Primary Examiner* — Edwin A. Leon
(74) *Attorney, Agent, or Firm* — Kratz, Quintos & Hanson, LLP

(57) ABSTRACT

A waterproof connector includes a terminal, a housing, an annular seal, a tubular cover, and a retainer. The housing includes a connector portion capable of being fitted to a fitting recess portion of a mating housing in a fitting direction. The seal is fitted to an outer peripheral surface of the connector portion and seal a space between the outer peripheral surface of the connector portion and an inner peripheral surface in the fitting recess portion of the mating housing. The cover includes an end wall portion and a tubular portion extending from the end wall portion in an opposite direction of the fitting direction, the tubular portion to be fitted to the outer peripheral surface of the connector portion. A regulating end surface of the tubular portion regulates movement of the seal in the fitting direction with respect to the connector portion by being abutted with a first annular end surface of the seal. The retainer includes a second locking portion locked onto a locking hole which is separated from the regulating end surface of the tubular portion in the fitting direction.

5 Claims, 14 Drawing Sheets

WATERPROOF CONNECTOR TO BE FITTED TO A MATING CONNECTOR IN A FITTING DIRECTION

CROSS REFERENCE TO RELATED APPLICATION

This application corresponds to Japanese Patent Application No. 2023-069397 filed in the Japan Patent Office on Apr. 20, 2023. The entire disclosure of this application is incorporated herein by reference.

BACKGROUND OF THE INVENTION

Field of the Invention

The present invention relates to a waterproof connector.

Description of Related Arts

A waterproof connector described in Japanese Unexamined Patent Application Publication No. 2020-24822 includes an annular packing that, when the waterproof connector is fitted to a mating connector, waterproofs a connection point between housings of the connectors.

The housing of the waterproof connector includes a connector portion that forms a terminal housing chamber. The packing is fitted to an outer periphery of the connector portion, and a front holder is fitted to an outer periphery at a position closer to the leading end side of the connector portion than the packing. In addition, a retainer fitted into a retainer mounting hole formed at a position closer to the leading end side of the connector portion than the packing locks a terminal.

A position of the packing is regulated by the two members of the front holder and the retainer so that the packing does not come off from the connector portion.

A cover portion of the front holder is elastically fitted to and held by an outer peripheral surface of the connector portion from the leading end side of the connector portion. When the fitting of the mating connector is released, a position of the front holder is displaced in a direction in which the front holder comes off from the connector portion, and as a result, the position of the packing is displaced, and sealing performance is lowered.

SUMMARY OF THE INVENTION

A preferred embodiment of the present invention provides a waterproof connector having a high sealing property.

The preferred embodiment of the present invention provides a waterproof connector to be fitted to a mating connector in a fitting direction, the waterproof connector including a terminal, a housing, an annular seal, a tubular cover, and a retainer. The housing includes a connector portion configured to be fitted to a fitting recess portion of a mating housing in the fitting direction. The connector portion includes an outer peripheral surface, an end surface in the fitting direction, and a terminal housing hole in which the terminal is housed. The seal is configured to be fitted to the outer peripheral surface of the connector portion and seal a space between the outer peripheral surface of the connector portion and an inner peripheral surface in the fitting recess portion of the mating housing. The seal includes a first annular end surface in the fitting direction, and a second annular end surface of an opposite direction of the fitting direction. The cover includes an end wall portion which has an outer surface directed in the fitting direction and an inner surface abutted with the end surface in the fitting direction of the connector portion, and a tubular portion extending from the end wall portion in the opposite direction of the fitting direction, the tubular portion to be fitted to the outer peripheral surface of the connector portion. The tubular portion includes a regulating end surface to regulate movement of the seal in the fitting direction with respect to the connector portion by being abutted with the first annular end surface of the seal, and a locking hole which is separated from the regulating end surface in the fitting direction. The retainer is inserted into and locked onto a locking hole provided in the connector portion from an orthogonal direction orthogonal to the fitting direction. The retainer includes a first locking portion to lock the terminal, and a second locking portion to be locked onto the locking hole of the tubular portion of the cover.

According to this arrangement, position regulation for retaining the annular seal is performed by the regulating end surface of the cover which is a single member. By locking the cover by the retainer having the second locking portion locked onto the locking hole which is separated from the regulating end surface, position displacement of the cover with respect to the connector portion is reliably suppressed. Therefore, it is possible to suppress a decrease in a sealing property due to the position displacement of the seal and enhance the sealing property.

In a preferred embodiment, the terminal includes a protruding portion protruding from the end surface in the fitting direction of the connector portion. The outer surface of the end wall portion of the cover is located at a position more forward in the fitting direction than the protruding portion of the terminal. According to this arrangement, at the time of connecting to the mating connector, the end wall portion of the cover protects the terminal. Thus, it is possible to suppress contorting of the terminal.

In a preferred embodiment, the end wall portion of the cover includes a protruding portion housing hole in which the protruding portion of the terminal is housed, the protruding portion housing hole is configured so that a mating terminal to be connected to the terminal is inserted into the protruding portion housing hole. According to this arrangement, at the time of connecting to the mating connector, in the protruding portion housing hole of the end wall portion of the cover, the terminal is connected to the mating terminal. Thus, it is possible to reliably suppress contorting of the terminal.

In a preferred arrangement, a projection protruding from at least one of the inner surface of the end wall portion of the cover and the end surface in the fitting direction of the connector portion is inserted into and fitted to a fitting hole formed on the other. According to this arrangement, it is possible to improve deformation strength of the cover and the connector portion, and therefore, at the time of fitting to the mating connector, it is possible to effectively suppress contorting of the terminal.

In a preferred embodiment, the regulating end surface of the tubular portion of the cover is configured to regulate the movement of the seal in the fitting direction with respect to the connector portion by being abutted with the first annular end surface of the seal over a circumference in a circumferential direction. According to this arrangement, it is possible to reliably suppress the position displacement of the seal and enhance the sealing property.

DETAILED DESCRIPTION OF THE PREFERRED EMBODIMENTS

Hereinafter, a preferred embodiment that embodies the present invention will be described with reference to the drawings.

Figure 1:
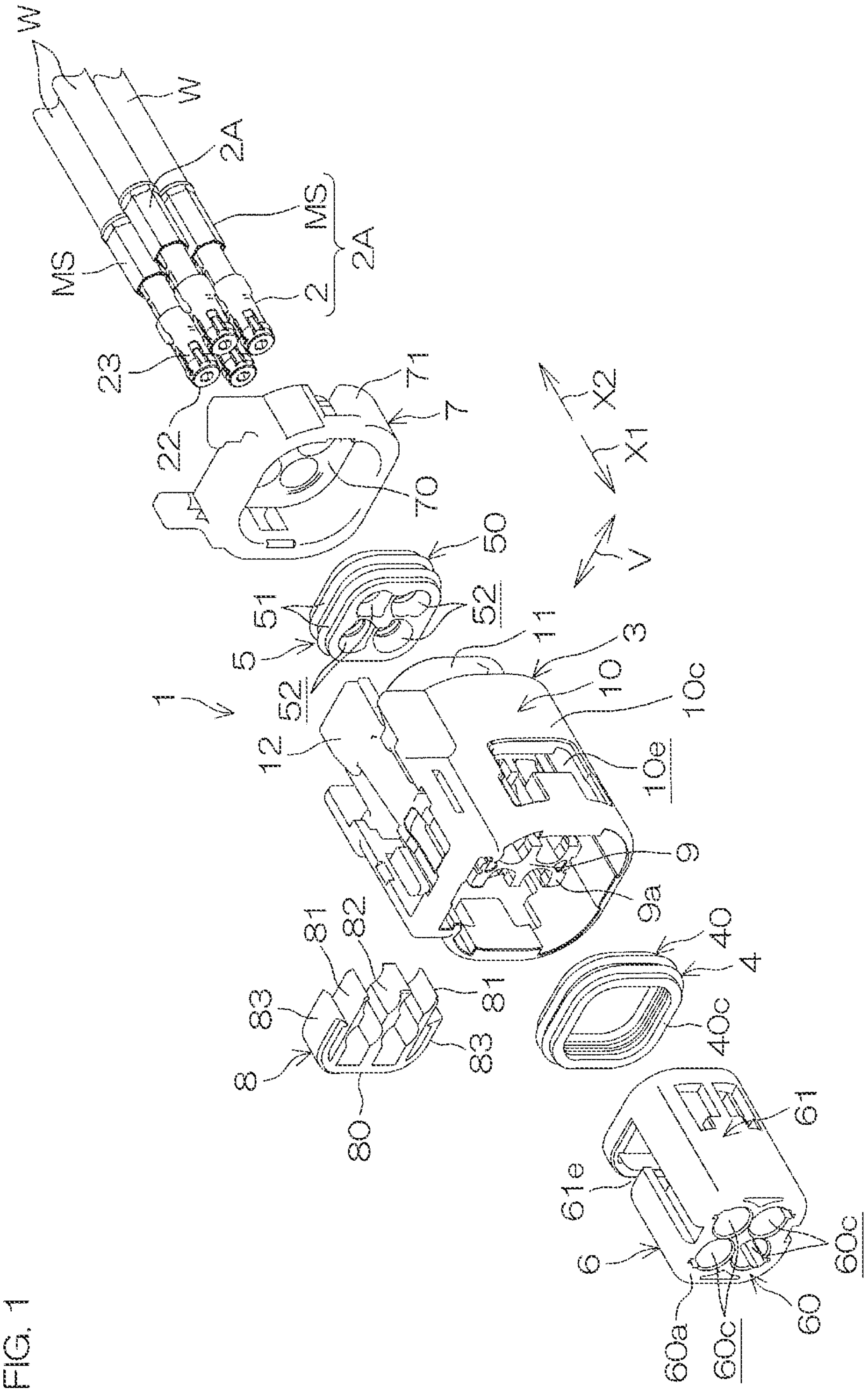
FIG. 1 is an exploded perspective view of a waterproof connector according to a preferred embodiment of the present invention.
Figure 2:
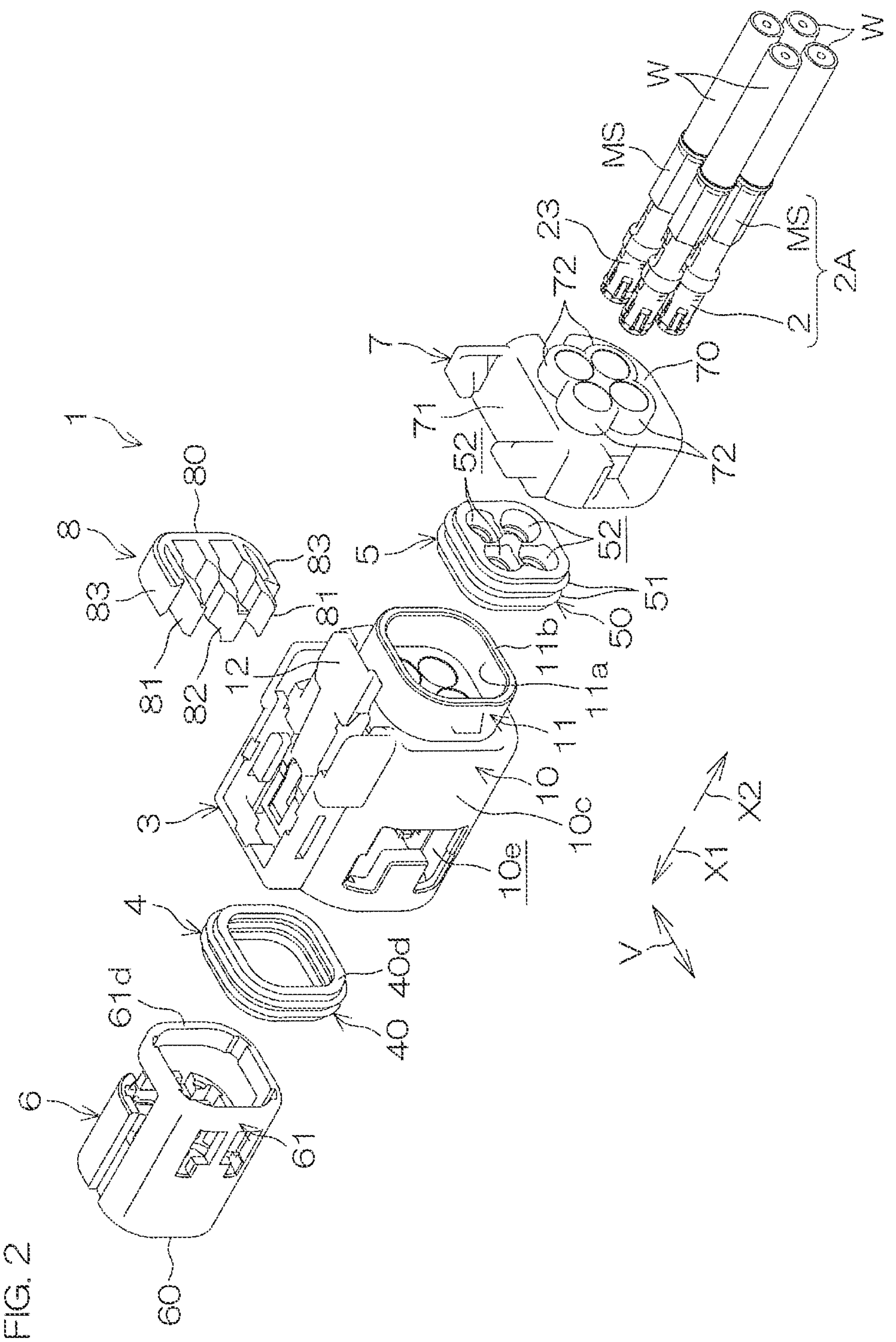
FIG. 2 is an exploded perspective view of the waterproof connector from another angle.
Figure 3:
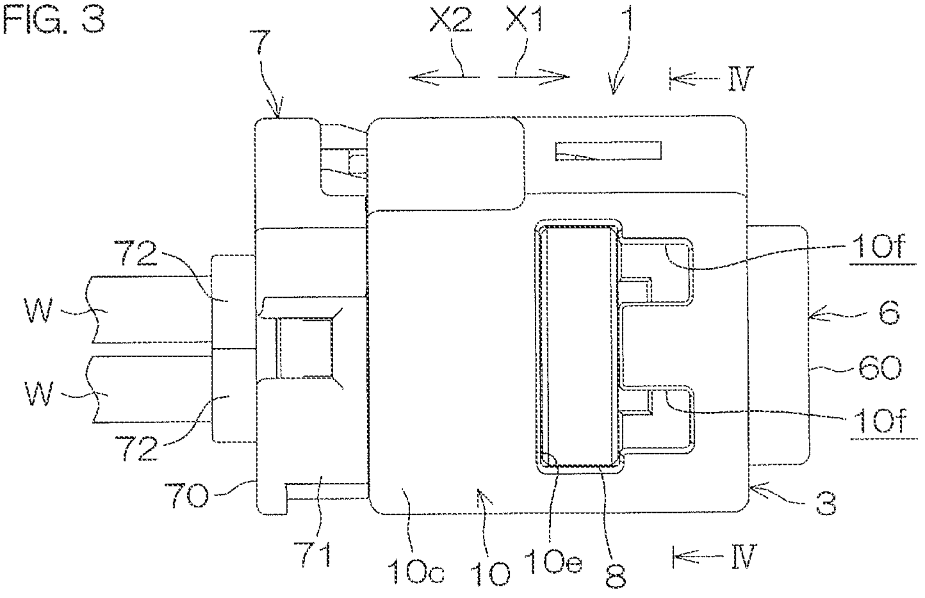
FIG. 3 is a side view of the waterproof connector.
Figure 4:
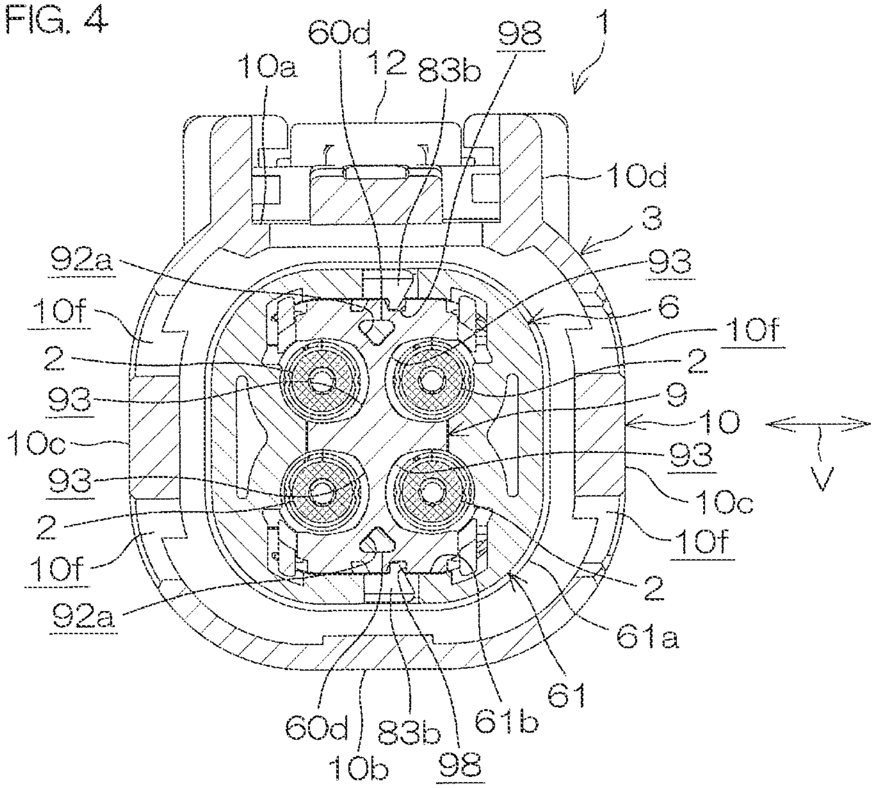
FIG. 4 is a cross-sectional view taken along IV-IV in FIG. 3.
Figure 5:
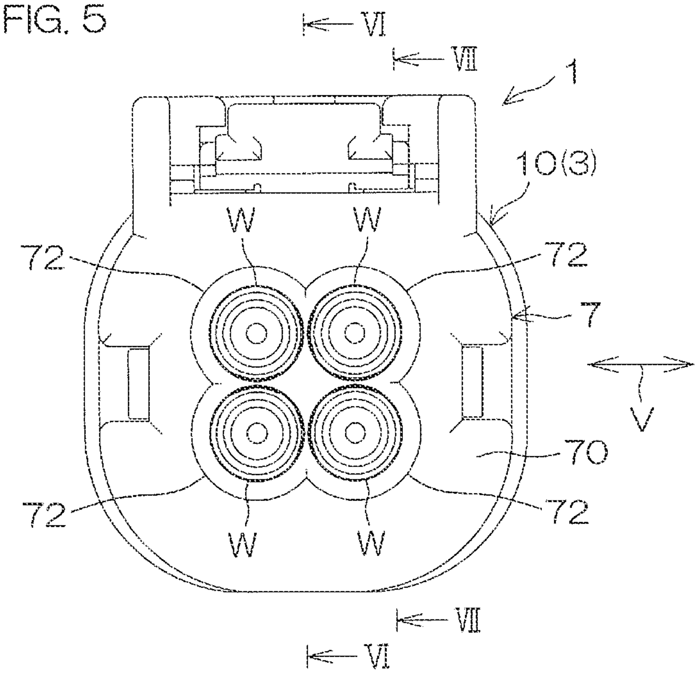
FIG. 5 is a rear view of the waterproof connector.
Figure 6:
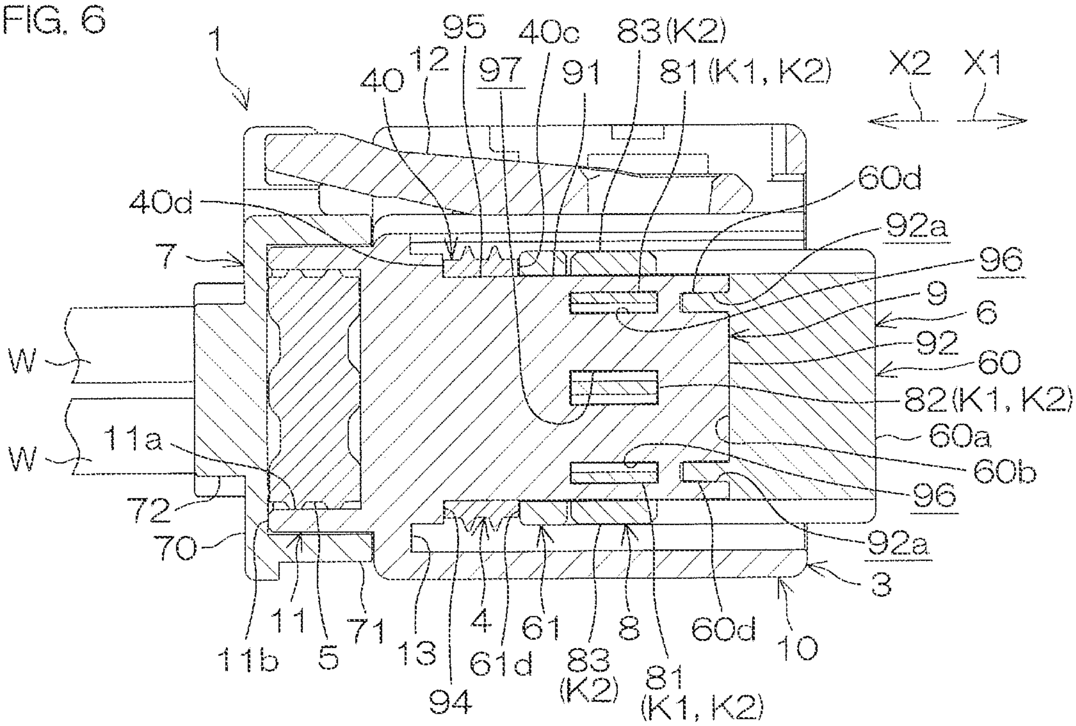
FIG. 6 is a cross-sectional view taken along VI-VI in FIG. 5.
Figure 7:
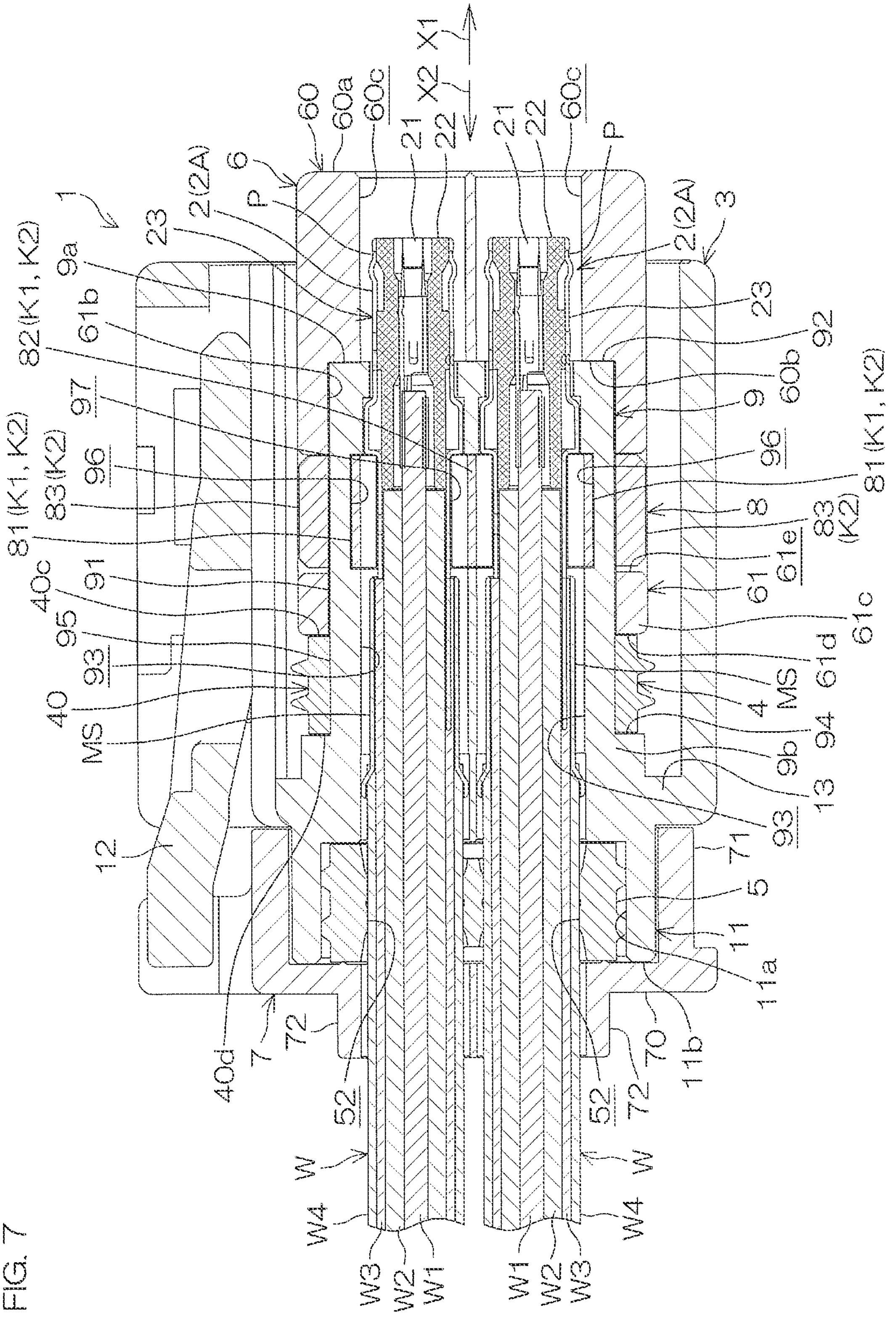
FIG. 7 is a cross-sectional view taken along VII-VII in FIG. 5.

FIG. 1 is an exploded perspective view of a waterproof connector according to a preferred embodiment of the present invention and FIG. 2 is an exploded perspective view of the waterproof connector from another angle. FIG. 3 is a side view of the waterproof connector and FIG. 4 is a cross-sectional view taken along IV-IV in FIG. 3. FIG. 5 is a rear view of the waterproof connector. FIG. 6 is a cross-sectional view taken along VI-VI in FIG. 5. FIG. 7 is a cross-sectional view taken along VII-VII in FIG. 5.

Figure 8:
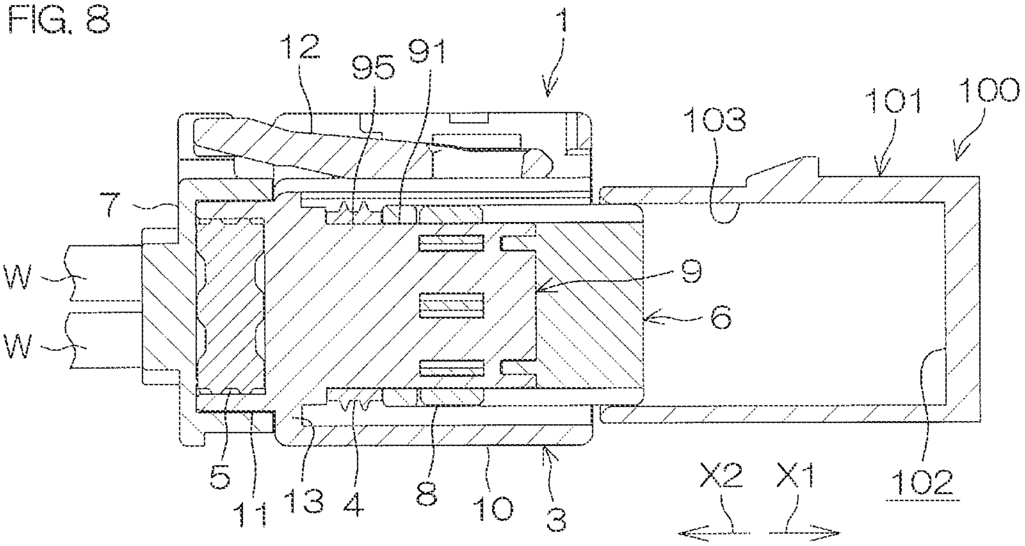
FIG. 8 is a cross-sectional view of the waterproof connector and a mating connector at an initial stage of fitting.
Figure 9:
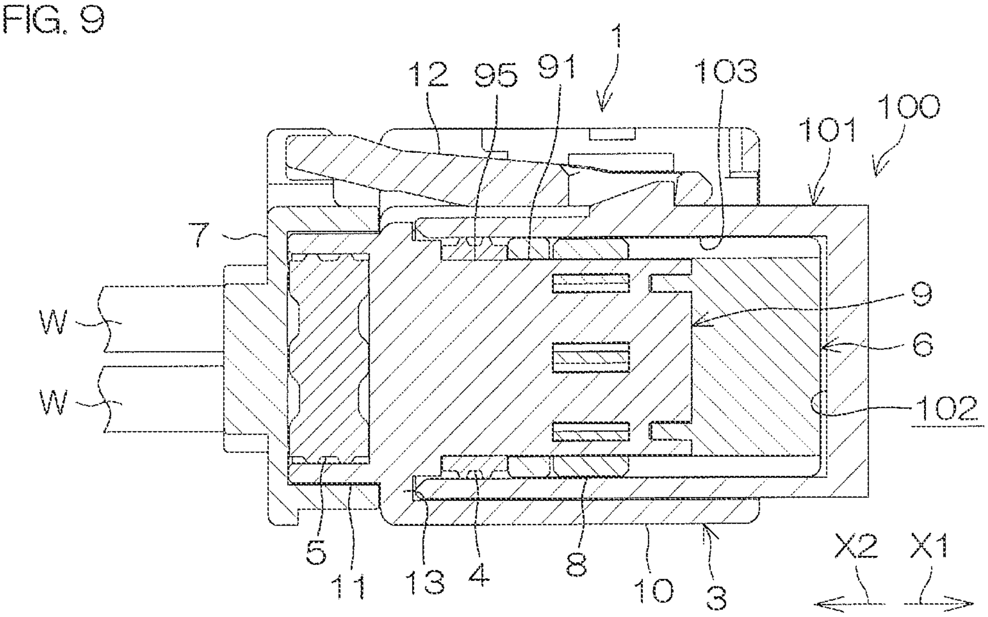
FIG. 9 is a cross-sectional view of the waterproof connector and the mating connector after fitting.

As shown in FIGS. 1 and 2, a waterproof connector 1 includes a plurality of terminal assemblies 2A, a housing 3, a first seal 4, a second seal 5, a first cover 6, a second cover 7, and a retainer 8. The waterproof connector 1 is fitted to a mating connector 100 (see FIGS. 8 and 9 showing a fitting process) in a fitting direction X1. Each of the terminal assemblies 2A includes a terminal 2 and a metal sleeve MS, and is pressure-bonded to an end portion of a corresponding electric wire W.

First, the housing 3 shall be described.

Figure 10:
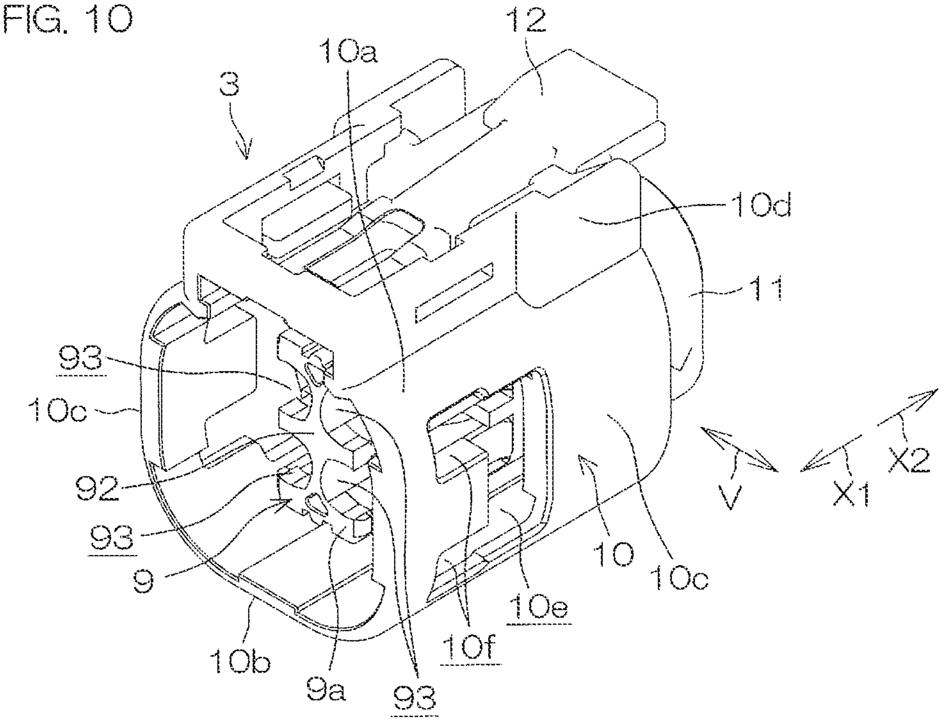
FIG. 10 is a perspective view of a housing.
Figure 11:
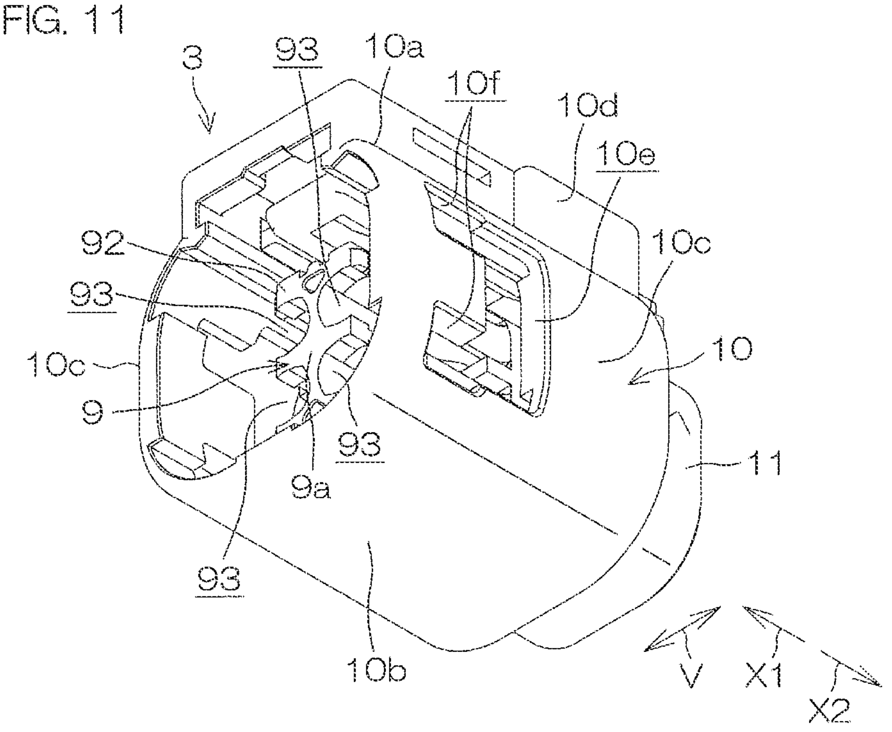
FIG. 11 is a perspective view of the housing from another angle.
Figure 12:
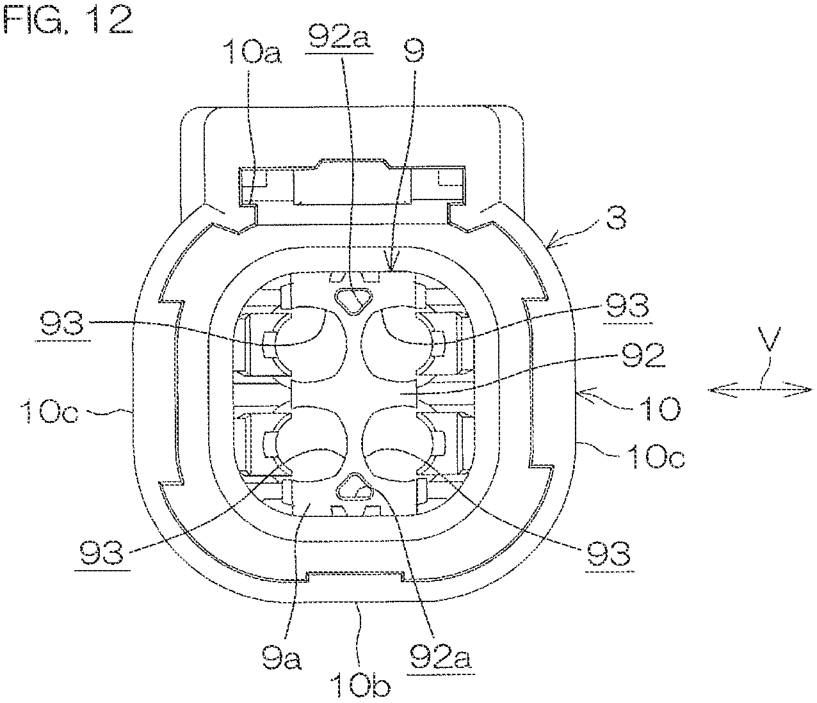
FIG. 12 is a front view of the housing.
Figure 13:
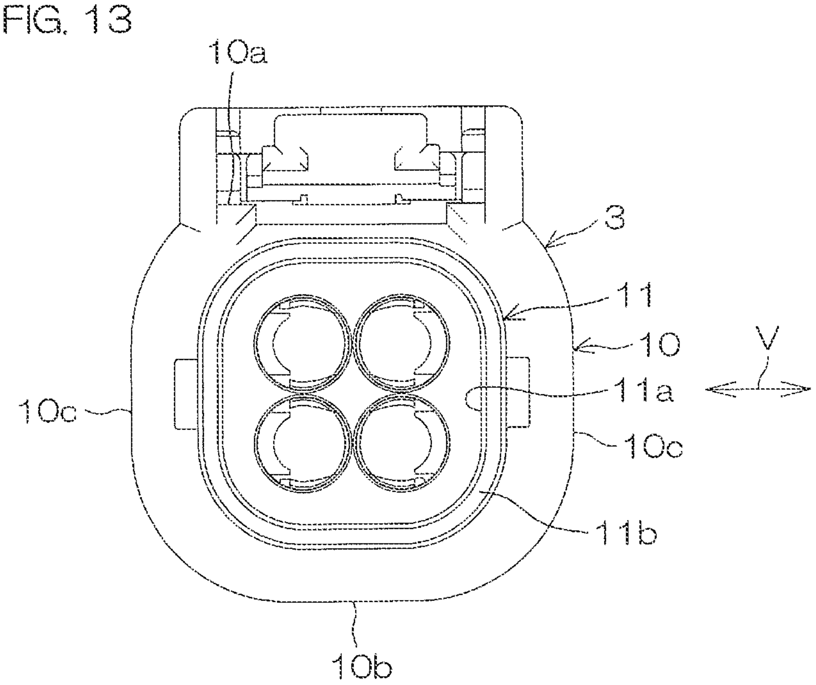
FIG. 13 is a rear view of the housing.
Figure 14:
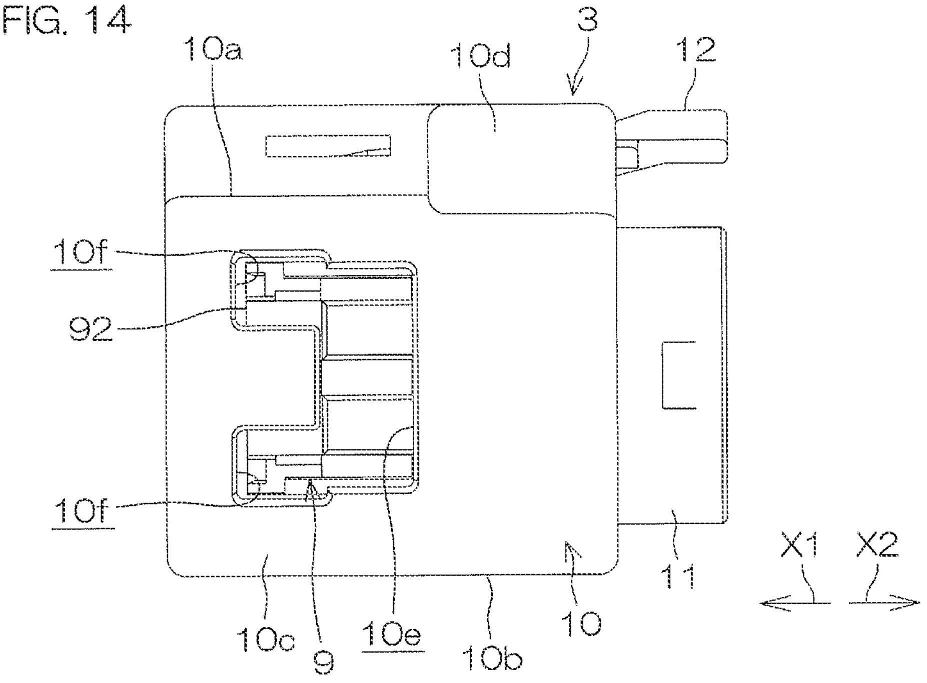
FIG. 14 is a side view of one side of the housing.
Figure 15:
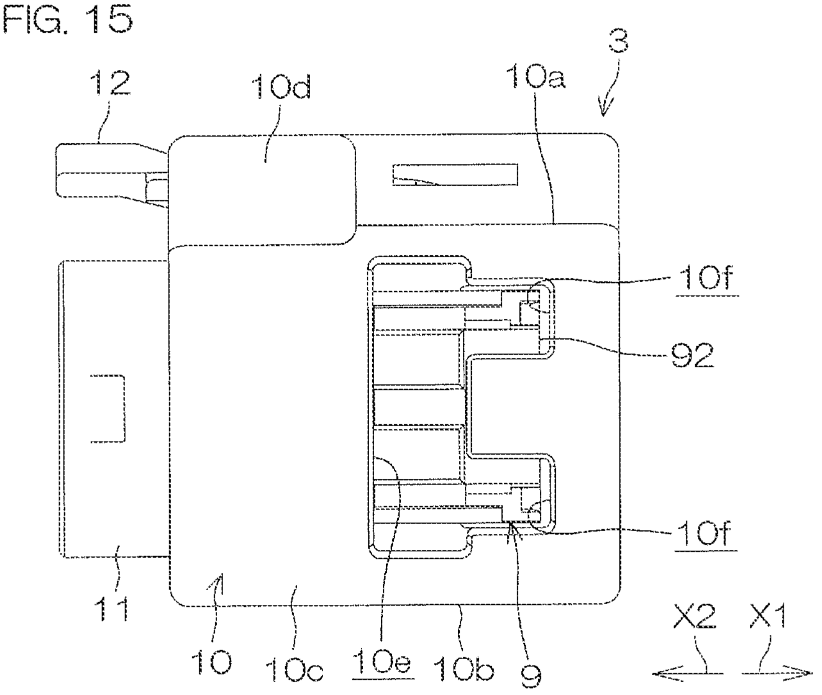
FIG. 15 is a side view of the other side of the housing.

FIG. 10 is a perspective view of the housing 3. FIG. 11 is a perspective view of the housing 3 from another angle. FIG. 12 is a front view of the housing 3. FIG. 13 is a rear view of the housing 3. FIG. 14 is a side view of one side of the housing 3. FIG. 15 is a side view of the other side of the housing 3.

As shown in FIGS. 10 and 11, the housing 3 includes a connector portion 9, a hood 10, an electric wire holding portion 11, a lock arm 12, and a hood coupling portion 13 (see FIG. 7). The housing 3 is made of synthetic resin having an insulating property. The connector portion 9 can be fitted to a fitting recess portion 102 of a mating housing 101 (see FIGS. 8 and 9) in the fitting direction X1.

As shown in FIG. 7, the connector portion 9 includes a front end portion 9*a* serving as an end portion in the fitting direction X1, a rear end portion 9*b* serving as an end portion in an opposite direction X2 of the fitting direction X1, an outer peripheral surface 91, and an end surface 92 in the fitting direction X1. In addition, the connector portion 9 includes a plurality of terminal housing holes 93 (see FIGS. 4 and 12), an annular step portion 94, a seal mounting portion 95, locking holes 96, 97 (see FIG. 6), and a pair of locking grooves 98 (see FIG. 4).

As shown in FIG. 7, part of the terminal assemblies 2A and part of the electric wires W connected to the terminal assemblies 2A are housed in the terminal housing holes 93. The annular step portion 94 is formed in the rear end portion 9*b* of the connector portion 9. On the outer peripheral surface 91, a part of a predetermined range adjacent to the annular step portion 94 in the fitting direction X1 corresponds to the seal mounting portion 95. The first seal 4 is fitted to the seal mounting portion 95.

As shown in FIG. 9, the first seal 4 fitted to the seal mounting portion 95 of the outer peripheral surface 91 of the connector portion 9 seals a space between the outer peripheral surface 91 of the connector portion 9 and an inner peripheral surface 103 of the fitting recess portion 102 of the mating housing 101 of the mating connector 100.

As shown in FIG. 7, the hood 10 is coupled to the rear end portion 9*b* of the connector portion 9 via the hood coupling portion 13. The hood 10 is a square tube extending from the rear end portion 9*b* of the connector portion 9 in the fitting direction X1 and surrounding the connector portion 9.

As shown in FIGS. 10 to 13, the square-tubular hood 10 includes an upper wall 10*a*, a bottom wall 10*b*, and a pair of side walls 10*c*. The lock arm 12 is oscillatably supported by a supporting portion 10*d* provided on the upper wall 10*a* of the hood 10, and locks a state of fitting to the mating connector 100 (see FIG. 9). As shown in FIGS. 14 and 15, a retainer mounting hole 10*e* in which the retainer 8 is mounted and a pair of punching holes 10*f* are formed in each of the side walls 10*c* of the hood 10.

As shown in FIG. 4, each of the terminal housing holes 93 of the connector portion 9 has a semi-circular section. By fitting a tubular portion 61 of the first cover 6 to the connector portion 9, the terminal housing hole 93 having a semi-circular section and a part having a semi-circular section of an inner peripheral surface 61*b* of the tubular portion 61 of the first cover 6 are combined with each other, so that a terminal housing hole having a circular section is formed.

As shown in FIG. 2, the electric wire holding portion 11 is formed in a square-tubular shape, and as shown in FIG. 7, extends from the rear end portion 9*b* of the connector portion 9 in the opposite direction of the hood 10 (the opposite direction X2 of the fitting direction X1).

As shown in FIG. 2, the second seal 5 includes a square seal main body 50, a plurality of outer peripheral seal lips 51, and a plurality of electric wire insertion holes 52 passing through the seal main body 50 in the fitting direction X1. As shown in FIG. 7, the electric wire W is inserted through each of the electric wire insertion holes 52. The second seal 5 seals a space between an inner wall surface 11*a* of the electric wire holding portion 11 (see FIG. 13) and each electric wire W.

As shown in FIG. 2, the second cover 7 includes an end wall portion 70, a tubular portion 71 extending from the end wall portion 70 in the fitting direction X1, and a plurality of electric wire holding tubes 72 extending from the end wall portion 70 in the opposite direction X2 of the fitting direction X1. As shown in FIG. 7, the second cover 7 is detachably attached to the electric wire holding portion 11 so that the second cover 7 closes the rear end portion 11*b* of the electric wire holding portion 11.

Next, the electric wire W and the terminal 2 shall be described.

As shown in FIG. 7, the electric wire W is a coaxial cable and includes a central conducting body W1, a dielectric body W2 surrounding the central conducting body W1, an outside conductive body W3 such as a braided wire covering the dielectric body W2, and an insulation sheath W4 covering the outside conducting body W3. The terminal 2 includes a central contact 21 connected to the central conducting body W1, a cylindrical insulator 22, and an outside contact 23 connected to the outside conducting body W3.

As shown in FIG. 7, regarding the fitting direction X1, part of the terminal 2 constitutes a protruding portion P by protruding from the end surface 92 in the fitting direction X1 of the connector portion 9. The protruding portion P is housed in a protruding portion housing hole 60*c* formed in an end wall portion 60 of the first cover 6 (see FIGS. 19 to 22).

Next, the first seal 4 shall be described.

Figure 16:
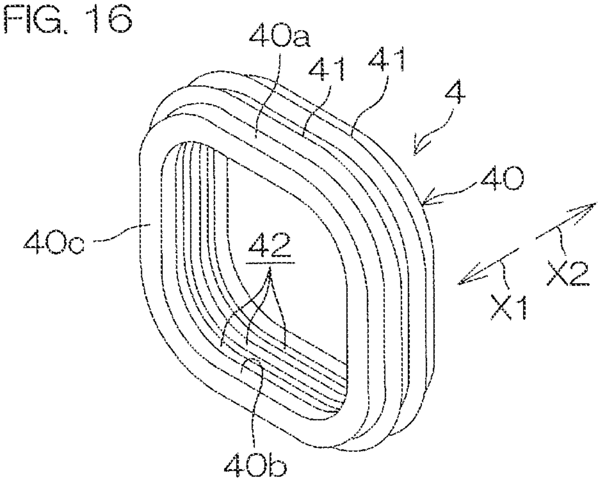
FIG. 16 is a perspective view of a first seal.
Figure 17:
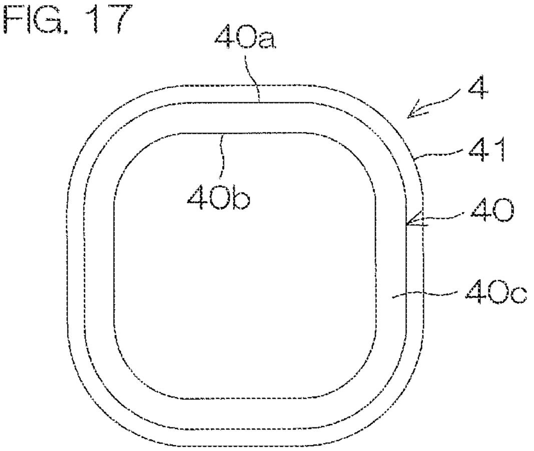
FIG. 17 is an elevation view of the first seal.
Figure 18:
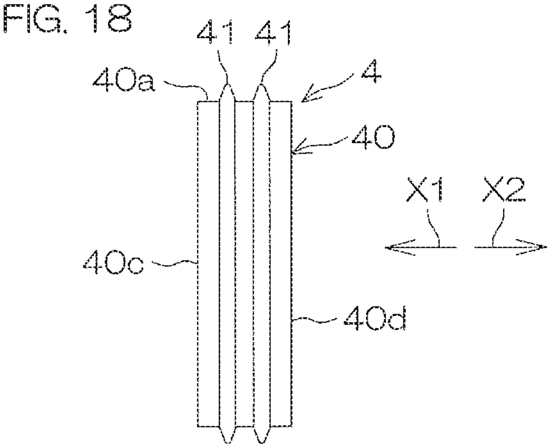
FIG. 18 is a side view of the first seal.

FIG. 16 is a perspective view of the first seal 4. FIG. 17 is an elevation view of the first seal 4. FIG. 18 is a side view of the first seal 4. The first seal 4 includes a square-annular seal main body 40, a plurality of outer peripheral seal lips 41, and a plurality of inner peripheral grooves 42. The seal main body 40 includes an outer peripheral surface 40*a*, an inner peripheral surface 40*b*, a first annular end surface 40*c* in the fitting direction X1, and a second annular end surface 40*d* in the opposite direction X2 of the fitting direction X1. The first annular end surface 40*c* and the second annular end surface 40*d* are flat surfaces orthogonal to the fitting direction X1.

The plurality of outer peripheral seal lips 41 extend over the entire circumference in a circumferential direction of the outer peripheral surface 40*a* of the seal main body 40, and are separated from each other in an axial direction. The inner peripheral grooves 42 extend over the entire circumference in the circumferential direction of the inner peripheral surface 40*b* of the seal main body 40, and are separated from each other in the axial direction.

Next, the first cover 6 shall be described.

Figure 19:
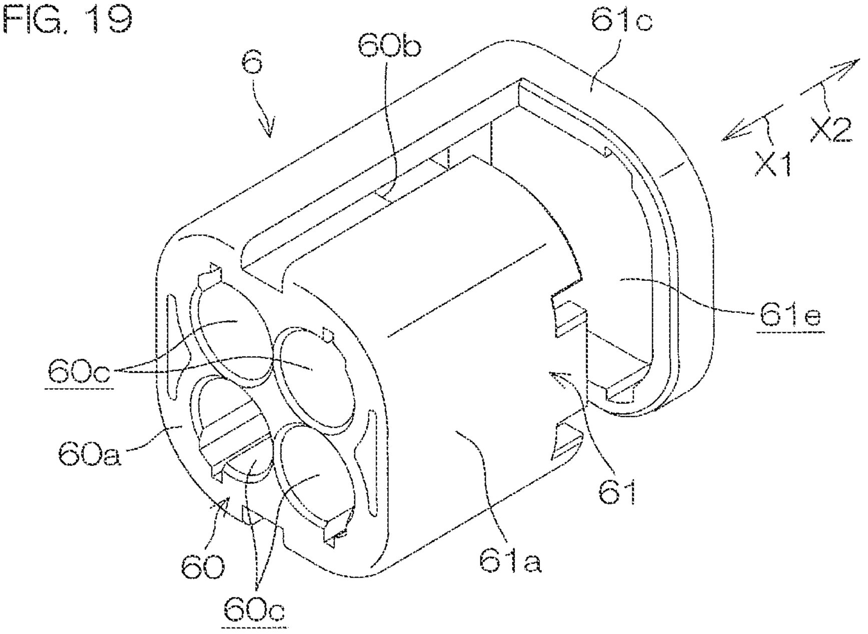
FIG. 19 is a perspective view of a first cover.
Figure 20:
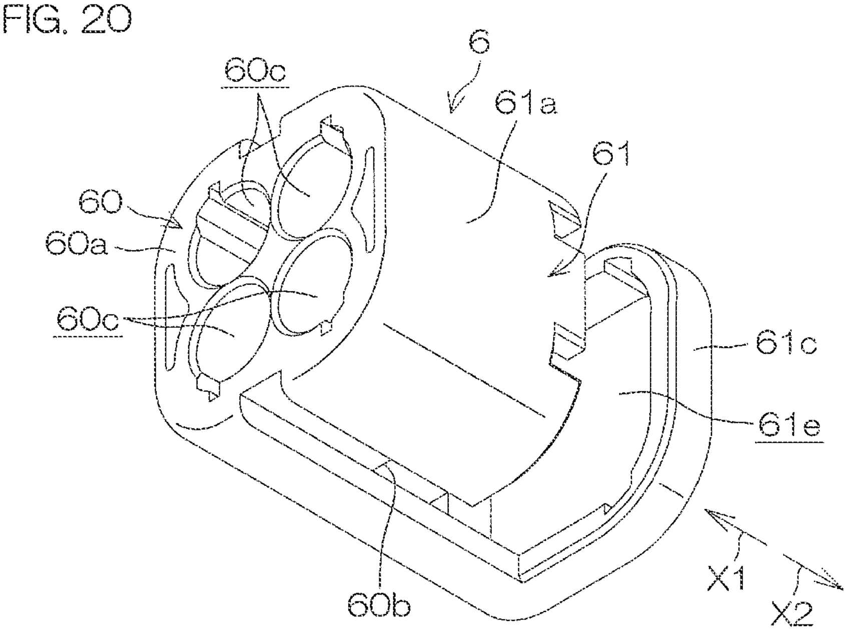
FIG. 20 is a perspective view of the first cover from another angle.
Figure 21:
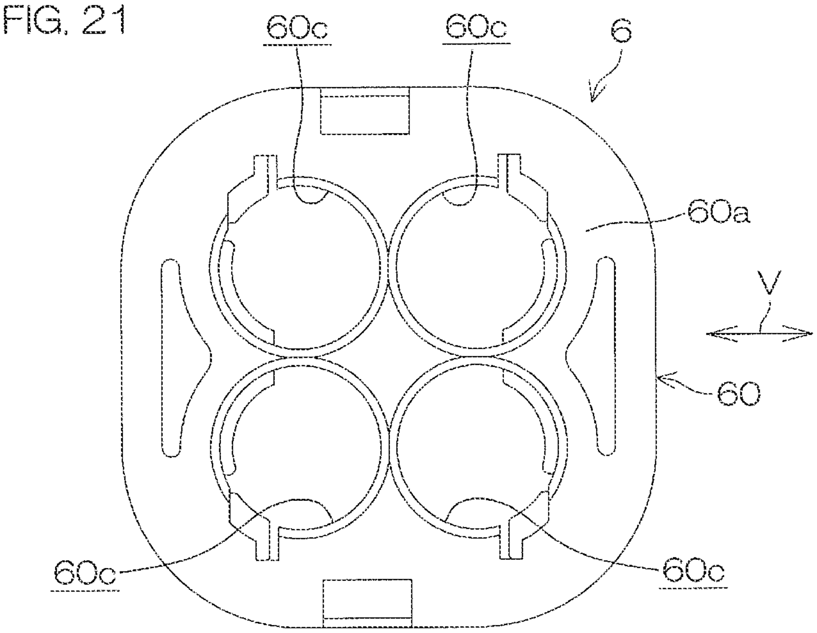
FIG. 21 is a front view of the first cover.
Figure 22:
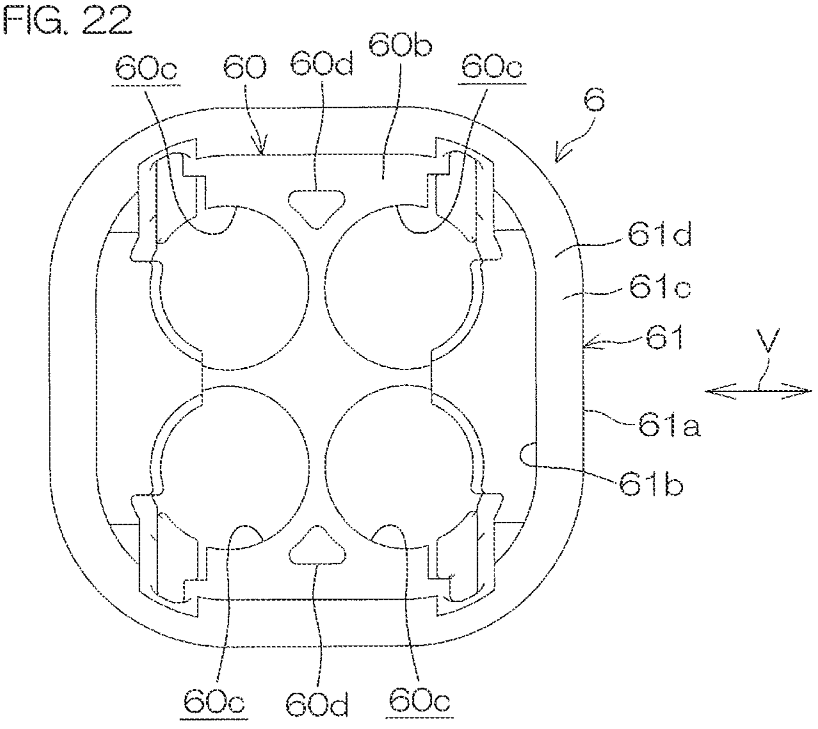
FIG. 22 is a rear view of the first cover.
Figure 23:
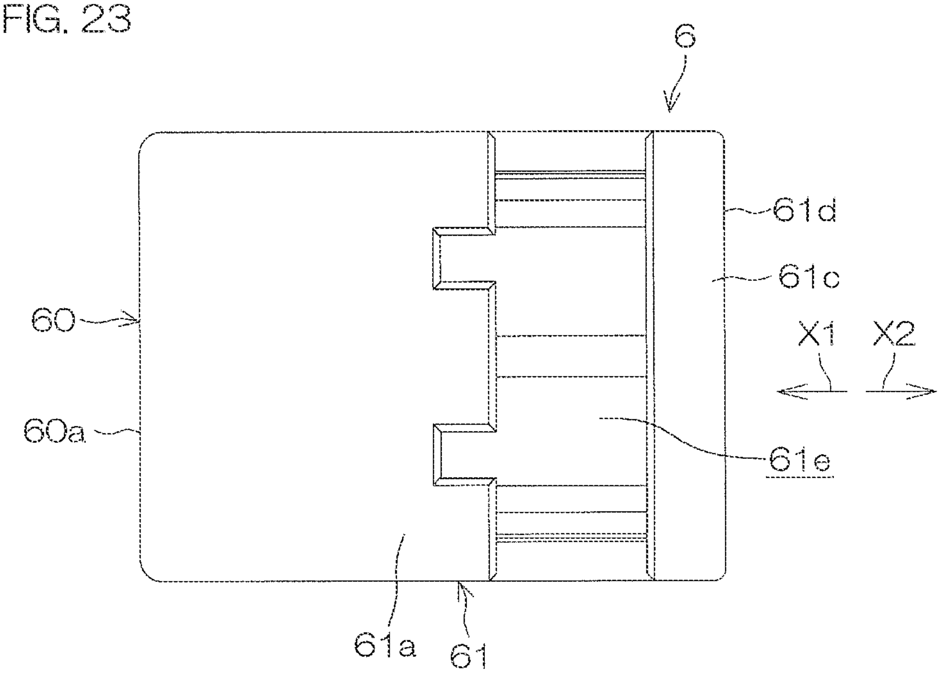
FIG. 23 is a side view of one side of the first cover.
Figure 24:
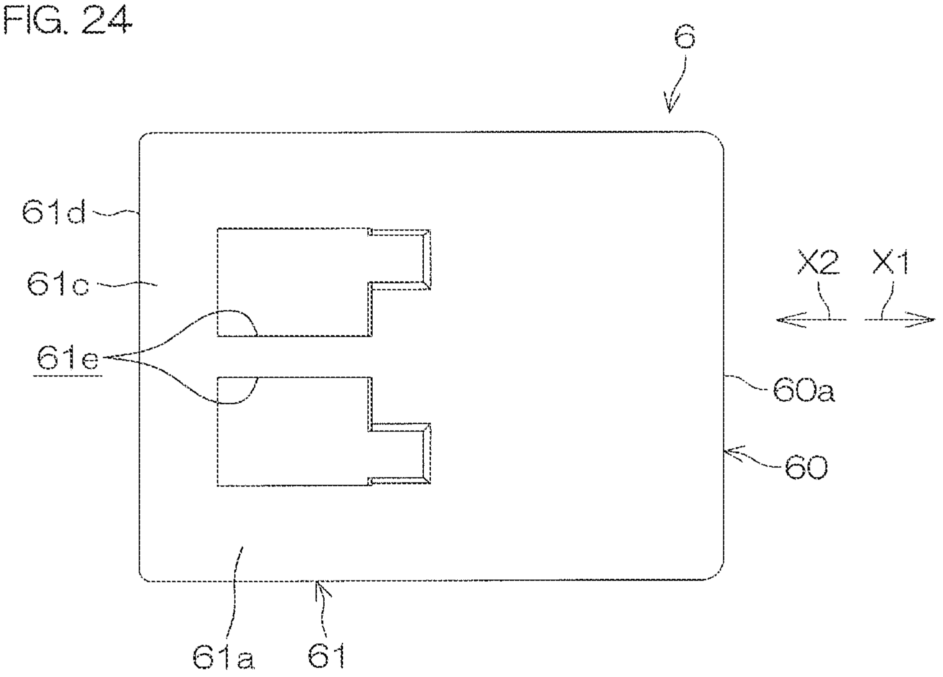
FIG. 24 is a side view of the other side of the first cover.

FIG. 19 is a perspective view of the first cover 6 and FIG. 20 is a perspective view of the first cover 6 from another angle. FIG. 21 is a front view of the first cover 6 and FIG. 22 is a rear view of the first cover 6. FIG. 23 is a side view of one side of the first cover 6 and FIG. 24 is a side view of the other side of the first cover 6.

As shown in FIGS. 19 and 20, the first cover 6 includes the end wall portion 60, and the square-tubular tubular portion 61 extending from the end wall portion 60 in the opposite direction X2 of the fitting direction X1. The end wall portion 60 includes an outer surface 60*a* facing the fitting direction X1, an inner surface 60*b* facing the opposite direction X2 of the fitting direction X1 (see FIGS. 7 and 22), the plurality of protruding portion housing holes 60*c* inserted through the outer surface 60*a* and the inner surface 60*b*, and a projection 60*d*.

As shown in FIG. 7, the protruding portion P of the terminal 2 is housed in each of the protruding portion housing holes 60*c* of the end wall portion 60. That is, the outer surface 60*a* of the end wall portion 60 of the first cover 6 is located at a position more forward in the fitting direction X1 than the protruding portion P of the terminal 2. Each of the protruding portion housing holes 60*c* communicates with the corresponding terminal housing hole 93 of the connector portion 9. As shown in FIGS. 6 and 22, the projection 60*d* protrudes from the inner surface 60*b* in the opposite direction X2 of the fitting direction X1.

As shown in FIG. 6, the inner surface 60*b* of the end wall portion 60 of the first cover 6 is abutted with the end surface 92 in the fitting direction X1 of the connector portion 9. Thereby, the first cover 6 is positioned in the fitting direction X1 with respect to the connector portion 9. In addition, the projection 60*d* protruding from the inner surface 60*b* of the end wall portion 60 of the first cover 6 in the opposite direction X2 of the fitting direction X1 is fitted to a fitting hole 92*a* formed on the end surface 92 in the fitting direction X1 of the connector portion 9.

A sectional shape of the projection 60*d* may be a triangle shape as shown in FIG. 4, or although not shown, may be a rectangular or other polygonal shape, or may be a round shape such as a circular shape or an elliptical shape. One or a plurality of projections 60*d* may be provided.

As shown in FIGS. 19 and 20, the tubular portion 61 includes an outer peripheral surface 61*a*, an inner peripheral surface 61*b*, an extended end 61*c*, an annular regulating surface 61*d* (see FIGS. 2, 7, and 22), and a locking hole 61*e* provided in each of side portions and separated from the regulating end surface 61*d* in the fitting direction X1 (see FIGS. 23 and 24). As shown in FIG. 7, the inner peripheral surface 61*b* of the tubular portion 61 is fitted to the outer peripheral surface 91 of the connector portion 9. The annular regulating end surface 61*d* is provided in the extended end 61*c*, and faces the opposite direction X2 of the fitting direction X1.

The first seal 4 is sandwiched and held between the annular step portion 94 of the connector portion 9 and the annular regulating end surface 61*d* of the tubular portion 61 of the first cover 6 in a state where the first seal 4 is fitted to the seal mounting portion 95 of the outer peripheral surface 91 of the connector portion 9. That is, by abutting the annular regulating end surface 61*d* of the tubular portion 61 of the first cover 6 with the first annular end surface 40*c* in the fitting direction X1 of the first seal 4 over the circumference in the circumferential direction, movement of the first seal 4 in the fitting direction X1 with respect to the connector portion 9 is regulated.

In addition, by abutting the annular step portion 94 of the connector portion 9 with the second annular end surface 40*d* in the opposite direction X2 of the fitting direction X1 of the first seal 4 over the circumference in the circumferential direction, movement of the first seal 4 in the opposite direction X2 of the fitting direction X1 with respect to the connector portion 9 is regulated.

Next, the retainer 8 shall be described.

Figure 25:
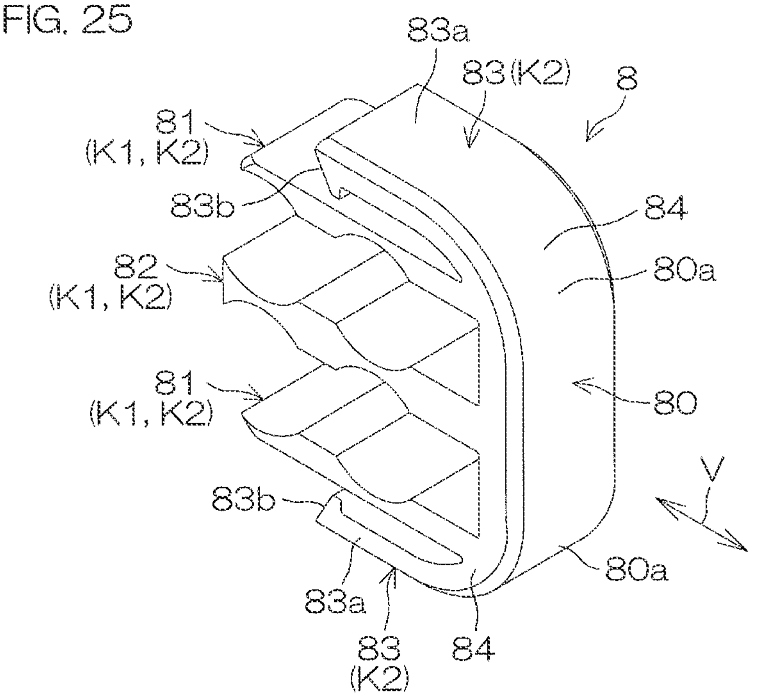
FIG. 25 is a perspective view of a retainer.
Figure 26:
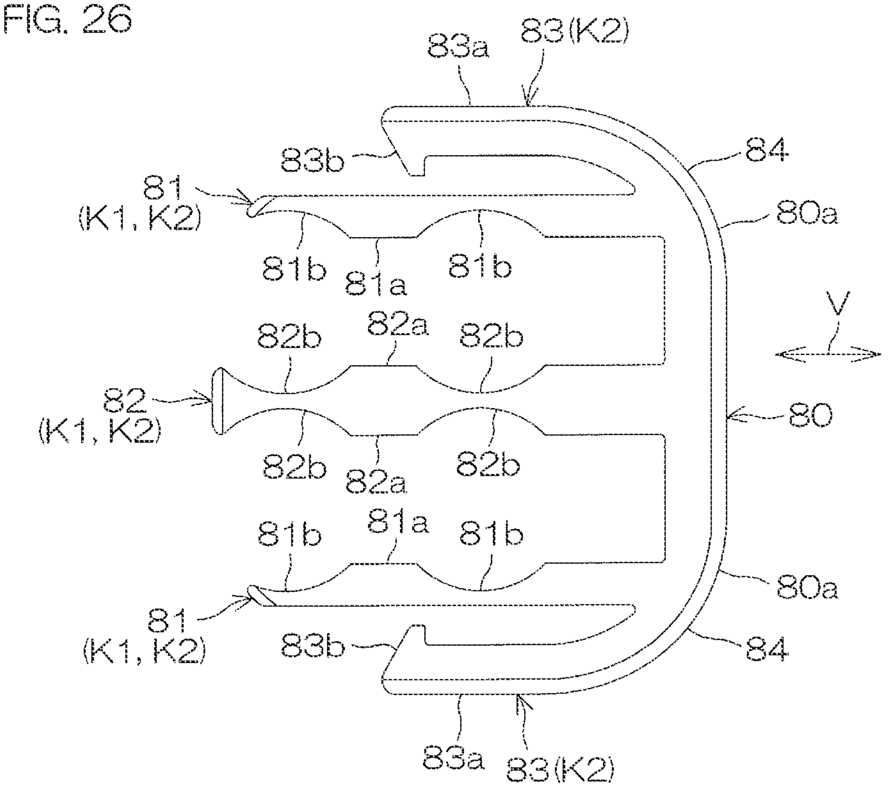
FIG. 26 is a side view of the retainer.

FIG. 25 is a perspective view of the retainer 8 and FIG. 26 is a side view of the retainer 8.

As shown in FIGS. 25 and 26, the retainer 8 includes a support frame 80 extending in an up and down direction, a pair of end portion arms 81, a central arm 82, a pair of locking arms 83, and a pair of curved portions 84. The pair of end portion arms 81 extend laterally from a pair of end portions 80*a* of the support frame 80. The central arm 82 extends laterally from a central portion of the support frame 80. The terminal 2 is held between curved recess portions 81*b*, 82*b* formed on opposing surfaces 81*a*, 82*a* of each of the end portion arms 81 and the central arm 82.

In addition, the pair of end portion arms 81, the central arm 82, and the pair of locking arms 83 of the retainer 8 are inserted into and locked onto the locking hole 61*e* of the tubular portion 61 of the first cover 6. Each of the pair of end portion arms 81, the central arm 82, and the pair of locking arms 83 of the retainer 8 constitutes a second locking portion K2 that locks the first cover 6 in the fitting direction X1.

In addition, the pair of end portion arms 81 and the central arm 82 constitute a first locking portion K1 that retains and locks the terminal 2 by being abutted with a loop band 233 of the outside contact 23 of the terminal 2 (see FIGS. 2 and 7) from the opposite direction X2 of the fitting direction X1.

Each of the pair of locking arms 83 includes an arm main body 83*a* extending from each of the pair of end portions 80*a* of the support frame 80 via the curved portion 84 in a cantilever manner in parallel to the end portion arm 81, and a hook 83*b* provided in a leading end of the arm main body 83*a*.

The pair of end portion arms 81 are respectively fitted to and locked onto the pair of locking holes 96 of the connector portions 9 (see FIG. 6). The central arm 82 is fitted to and locked onto the locking hole 97 of the connector portion 9 (see FIG. 6). The pair of locking arms 83 are respectively fitted to and locked onto the pair of locking grooves 98 of the outer peripheral surface 91 of the connector portion 9 (see FIG. 4). Thereby, the retainer 8 is retained in an orthogonal direction V.

According to the present preferred embodiment, as shown in FIG. 7, position regulation for retaining the annular first seal 4 is performed by abutting the regulating end surface 61*d* of the first cover 6 which is a single member (see FIG. 2) with the first annular end surface 40*c* of the first seal 4 (see FIG. 1). In addition, the retainer 8 inserted into and locked onto the locking holes 96, 97 provided in the connector portion 9 from the orthogonal direction V orthogonal to the fitting direction X1 (direction orthogonal to a paper plane in FIG. 7) includes the first locking portion K1 (of the end portion arms 81 and the central arm 82) that locks the terminal 2, and the second locking portion K2 (of the end portion arms 81, the central arm 82, and the locking arms 83) locked onto the locking hole 61*e* separated from the regulating end surface 61*d* of the tubular portion 61 of the first cover 6 in the fitting direction X1. By the retainer 8, position displacement of the first cover 6 with respect to the connector portion 9 is reliably suppressed. Therefore, it is possible to suppress a decrease in a sealing property due to the position displacement of the first seal 4 and enhance the sealing property.

In addition, as shown in FIG. 7, the terminal 2 includes the protruding portion P protruding from the end surface 92 in the fitting direction X1 of the connector portion 9. The outer surface 60*a* of the end wall portion 60 of the first cover 6 is located at a position more forward in the fitting direction X1 than the protruding portion P of the terminal 2. According to this arrangement, at the time of connecting to the mating connector 100, the end wall portion 60 of the first cover 6 protects the terminal 2. Thus, it is possible to suppress contorting of the terminal 2.

In addition, the end wall portion 60 of the first cover 6 includes the protruding portion housing hole 60*c* in which the protruding portion P of the terminal 2 is housed. A mating terminal (not shown) to be connected to the terminal 2 is inserted into the protruding portion housing hole 60*c*. According to this arrangement, at the time of connecting to the mating connector 100, in the protruding portion housing hole 60*c* of the end wall portion 60 of the first cover 6, the terminal 2 is connected to the mating terminal. Thus, it is possible to reliably suppress contorting of the terminal 2.

In addition, as shown in FIG. 6, the projection 60*d* protruding from the inner surface 60*b* of the end wall portion 60 of the first cover 6 is inserted into and fitted to the fitting hole 92*a* formed on the end surface 92 in the fitting direction X1 of the connector portion 9. According to this arrangement, it is possible to improve deformation strength of the first cover 6 and the connector portion 9, and therefore, at the time of fitting to the mating connector 100, it is possible to effectively suppress contorting of the terminal 2. It is noted that although not shown in the figures, a projection provided on the end surface 92 in the connector portion 9 may be inserted into and fitted to a fitting hole provided on the inner surface 60*b* of the end wall portion 60 of the first cover 6.

In addition, the regulating end surface 61*d* of the tubular portion 61 of the first cover 6 regulates the movement of the first seal 4 in the fitting direction X1 with respect to the connector portion 9 by being abutted with the first annular end surface 40*c* of the first seal 4 over the circumference in the circumferential direction. According to this arrangement, it is possible to reliably suppress the position displacement of the first seal 4 and enhance the sealing property.

It is noted that although not shown in the figures, even in a case where a recess portion is formed in part of the regulating end surface 61*d* of the first cover 6 in the circumferential direction and the recess portion of the regulating end surface 61*d* is not abutted with the first annular end surface 40*c* of the first seal 4, by reliably suppressing the position displacement of the first cover 6 by the retainer 8, it is possible to reliably suppress the position displacement of the first seal 4, and it is thus possible to enhance the sealing property.

The present invention is not limited to the above preferred embodiment but the electric wire W may be not a coaxial cable but a normal electric wire. In addition, the present invention can be used as a waterproof connector for a substrate-to-electric wire connection or a waterproof connector for an electric wire-to-electric wire connection.

While the present invention has been described above with the preferred embodiment, those skilled in the art who understand the content described above would easily anticipate variations, modifications, and equivalents of the present invention. Therefore, the present invention should be the scope of the claims and the equivalent scope.

REFERENCE SIGNS LIST

1: waterproof connector
2: terminal
3: housing
4: first seal
6: first cover
8: retainer
9: connector portion
40: seal main body
40*c*: first annular end surface
40*d*: second annular end surface
60: end wall portion
60*a*: outer surface
60*b*: inner surface
60*c*: protruding portion housing hole
60*d*: projection
61: tubular portion
61*e*: locking hole
91: outer peripheral surface

92: end surface
92*a*: fitting hole
93: terminal housing hole
96: locking hole
97: locking hole
98: locking groove
100: mating connector
101: mating housing
102: fitting recess portion
103: inner peripheral surface
K1: first locking portion
K2: second locking portion
P: protruding portion
V: orthogonal direction
X1: fitting direction
X2: opposite direction

What is claimed is:

1. A waterproof connector to be fitted to a mating connector in a fitting direction, comprising:

a terminal;

a housing including a connector portion configured to be fitted to a fitting recess portion of a mating housing in the fitting direction, the connector portion including an outer peripheral surface, an end surface in the fitting direction, and a terminal housing hole in which the terminal is housed;

an annular seal configured to be fitted to the outer peripheral surface of the connector portion and seal a space between the outer peripheral surface of the connector portion and an inner peripheral surface in the fitting recess portion of the mating housing, the seal including a first annular end surface in the fitting direction, and a second annular end surface in an opposite direction of the fitting direction;

a cover including an end wall portion which has an outer surface directed in the fitting direction and an inner surface abutted with the end surface in the fitting direction of the connector portion, and a tubular portion extending from the end wall portion in the opposite direction of the fitting direction, the tubular portion to be fitted to the outer peripheral surface of the connector portion, the tubular portion including a regulating end surface to regulate movement of the seal in the fitting direction with respect to the connector portion by being abutted with the first annular end surface of the seal, and a first locking hole to be separated from the regulating end surface in the fitting direction; and a retainer to be inserted into and locked onto a second locking hole provided in the connector portion from an orthogonal direction orthogonal to the fitting direction, the retainer including a first locking portion to lock the terminal, and a second locking portion to be locked onto the first locking hole of the tubular portion of the cover.

2. The waterproof connector according to claim 1, wherein the terminal includes a protruding portion protruding from the end surface in the fitting direction of the connector portion, and the outer surface of the end wall portion of the cover is located at a position more forward in the fitting direction than the protruding portion of the terminal.

3. The waterproof connector according to claim 2, wherein the end wall portion of the cover includes a protruding portion housing hole in which the protruding portion of the terminal is housed, the protruding portion housing hole into which a mating terminal to be connected to the terminal is inserted.

4. The waterproof connector according to claim 3, wherein a projection protruding from at least one of the inner surface of the end wall portion of the cover and the end surface in the fitting direction of the connector portion is inserted into and fitted to a fitting hole formed on the other.

5. The waterproof connector according to claim 1, wherein the regulating end surface of the tubular portion of the cover is configured to regulate the movement of the seal in the fitting direction with respect to the connector portion by being abutted with the first annular end surface of the seal over a circumference in a circumferential direction.

* * * * *